Patented Jan. 2, 1945

2,366,518

UNITED STATES PATENT OFFICE 2,366,518

MANUFACTURE AND USE OF NITROSYL CHLORIDE

John J. Grebe, William C. Bauman, and Harold A. Robinson, Midland, Mich., assignors to The Dow Chemical Company, Midland, Mich., a corporation of Michigan No Drawing. Application December 26, 1941, Serial No. 424,498

15 Claims. (Cl. 23—203)

This invention relates to the manufacture and use of nitrosyl chloride and more particularly to an improved cyclic process for the preparation and use thereof as a chlorinating agent.

The chlorination with nitrosyl chloride of organic compounds, such as saturated or unsaturated hydrocarbons or their halogen substitution products, has been described in the literature. Chlorination with nitrosyl chloride is particularly advantageous in the case of the lower hydrocarbon compounds, i. e., those containing from one to five carbon atoms in the molecule, since the heat developed by the reaction is usually much less than when other chlorinating agents, such as elemental chlorine, are used and consequently the reaction temperature may be more readily controlled and the formation of undesirable by-products be reduced.

A number of methods for the formation of nitrosyl chloride are known, but these are not well suited to commercial practice for a number of reasons. One such method consists in reacting nitric oxide with chlorine according to the chemical equation $2NO+Cl_2=2NOCl$. However, the reaction proceeds only slowly in the absence of catalysts, e. g., it has been reported to be only 90 per cent complete after a reaction period of 1 hour 40 minutes at room temperature. Although the temperature coefficient of the reaction rate is positive, it is small and a satisfactory rate of reaction is not attained unless the reaction is carried out at elevated temperatures where the equilibrium established does not favor high yields of nitrosyl chloride. Catalysts for the reaction, such as activated carbon, nitrogen peroxide, bromine, and porous surface catalysts, have been proposed, but insofar as we are aware these have not proven satisfactory in commercial practice. The reaction of nitrogen peroxide with hydrogen chloride in accordance with the chemical equation $2NO_2+4HCl=2NOCl+2H_2O+Cl_2$ has also been proposed, but in practice the yield of nitrosyl chloride is low, due to the formation of by-products such as nitroxyl chloride, nitric acid and nitrogen oxides. Furthermore, as much as half of the hydrogen chloride used may be converted to free chlorine. Also, the water formed in the reaction decomposes a portion of the nitrosyl chloride product.

The chlorination of unsaturated organic compounds, e. g., unsaturated hydrocarbons or unsaturated halohydrocarbons, with nitrosyl chloride to produce saturated halohydrocarbons leads to the formation, along with the desired product, of one mol of nitric oxide for each mol of nitrosyl chloride used. When saturated hydrocarbons or saturated halohydrocarbons containing a hydrogen atom replaceable with chlorine are chlorinated with nitrosyl chloride, there is formed along with the halogen compound and the nitric oxide one-half mol of hydrogen chloride for each mol of nitrosyl chloride used. Such chlorination with nitrosyl chloride may be illustrated by the following equations which show the wide utility of nitrosyl chloride as a chlorinating agent:

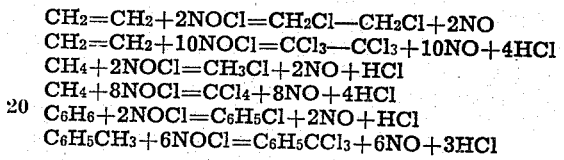

Other hydrocarbons and halohydrocarbons which may also effectively be chlorinated with nitrosyl chloride include ethane, propane, butane, pentane, methyl chloride, methyl bromide, methylene chloride, chloroform, ethyl chloride, ethylene dichloride, propylene, butylene, acetylene, butadiene, chlorobenzene, chlorotoluene, naphthalene, bromonaphthalene, cyclohexene, cyclohexane, tetralin, etc. It is evident that the commercial feasibility of using nitrosyl chloride as a chlorinating agent depends on convenient and economical methods, hitherto unavailable, of preparing the nitrosyl chloride and of utilizing the by-product nitric oxide and hydrogen chloride formed during its use.

We have found that nitrosyl chloride may be prepared very rapidly and in high yields by reacting together in the gaseous phase nitric oxide, hydrogen chloride and an oxidizing agent selected from the class consisting of oxygen, nitric acid, and nitrogen oxides in which the nitrogen has a valence greater than three. We have further found that the nitrosyl chloride so prepared may be used in a cyclic process for the chlorination of hydrocarbons and halohydrocarbons having an olefinic linkage or a hydrogen atom replaceable with chlorine and that the gaseous by-product of the reaction, comprising nitric oxide or a mixture of nitric oxide and hydrogen chloride, may be recycled and used directly and without separation into its components, for the formation of further quantities of nitrosyl chloride.

The reaction between nitric oxide, hydrogen chloride and oxygen or oxidizing nitrogen compounds to form nitrosyl chloride may be represented by the chemical equations:

$$4NO + 4HCl + O_2 = 4NOCl + 2H_2O$$
$$2NO + 3HCl + HNO_3 = 3NOCl + 2H_2O$$
$$NO + 2HCl + NO_2 = 2NOCl + H_2O$$
$$4NO + 6HCl + N_2O_5 = 6NOCl + 3H_2O$$

Although oxygen is the preferred oxidizing agent, oxidizing nitrogen compounds in which the nitrogen has a valence greater than three, such as nitrogen dioxide, nitrogen tetroxide and nitrogen pentoxide, may be used, if desired. Mixtures of oxygen and oxidizing nitrogen compounds may also be used.

Air is preferably employed as the source of the oxygen, although pure oxygen or mixtures of the same with air may be used. The nitric oxide is usually obtained by recycling the gaseous by-product mixture from the chlorination step of the process. As noted above, the recycled mixture also contains a portion of the hydrogen chloride necessary for preparing the nitrosyl chloride when the mixture is obtained from a chlorination reaction in which nitrosyl chloride has been used to effect replacement of hydrogen with chlorine. As will be explained later, such recycled mixture may also contain minor amounts of certain other gaseous products, such as carbon monoxide, carbon dioxide, hydrocarbons, and halohydrocarbons. Although minor amounts of hydrocarbons or halohydrocarbons may be recycled along with the mixture without interfering with the formation of the nitrosyl chloride, such recycled hydrocarbons and halohydrocarbons, and particularly those which are unsaturated or which are not highly halogenated, are preferably maintained in vaporized form to avoid any tendency toward the formation of explosive liquid mixtures of such compounds with the nitrosyl chloride. Liquid mixtures of highly halogenated saturated hydrocarbons, i. e., those containing not more than one hydrogen atom in the molecule, and nitrosyl chloride are not usually explosive, and, if desired, the recycled nitric oxide mixture may be scrubbed with such liquid highly halogenated saturated hydrocarbons, e. g., with carbon tetrachloride or chloroform, to remove any unsaturated or less highly halogenated hydrocarbon products which may be present and which may tend to form explosive mixtures with the nitrosyl chloride. The gaseous hydrogen chloride which is added to the reaction mixture in addition to that recycled from the chlorination step may be prepared in any of the usual ways. Minor amounts of chlorine, such as may be present in the hydrogen chloride from certain sources, is not disadvantageous. If desired, chlorine may be used to replace a minor portion of the hydrogen chloride and oxygen in the reaction mixture, particularly when catalysts such as nitrogen dioxide, bromine, or porous surface catalysts, etc., are present. It should be pointed out, however, that in the preferred mode of operation, wherein the proportion of chlorine in the reaction mixture is small, the use of catalysts is not usually necessary, although they may be employed, if desired. Although not essential, it is advantageous to introduce the gaseous hydrogen chloride and the oxidizing agent into the system in substantially anhydrous condition. Such procedure not only reduces corrosion of the equipment used in handling these materials, but also reduces the amount of water to be removed from the reacted mixture in the manner described later.

The reaction between nitric oxide, hydrogen chloride, and the oxidizing agent to form nitrosyl chloride is carried out by mixing them together in continuous manner. The reactants may be mixed at atmospheric pressure, although higher or lower pressures may be employed, if desired. The reaction, which proceeds rapidly and in fact almost instantaneously even at room temperature, is highly exothermic and the mixture is cooled to avoid the development of excessive temperatures in the reaction zone. Although the reaction temperature depends somewhat upon the pressure employed, it is usually maintained between 0° and 400° C. and preferably between 0° and 200° C.

The nitric oxide and the oxidizing agent are preferably used in approximately the stoichiometric proportions indicated in the above equations, i. e., in the case of oxygen, 0.25 mol of oxygen to 1 mol of nitric oxide. However, they may be used in widely varying proportions without interfering with the course of the reaction. The use of oxidizing nitrogen compounds in place of the oxygen usually reduces the proportion of nitric oxide which is used in the reaction mixture, since the nitrogen in the oxidizing nitrogen compound usually appears among the products as nitrosyl chloride. Since such oxidizing nitrogen compounds also serve, in effect, as a source of nitric oxide, they are herein included in the term "nitric oxide reactant," a chemically equivalent proportion of such "nitric oxide reactant" being considered equal to the molecular proportion of the "nitric oxide reactant" divided by the number of nitrogen atoms in the molecule. Although the proportion of hydrogen chloride used in the reaction mixture depends somewhat on the reaction conditions, and on the amount of water contained in the reactant gases, from 1.03 to 1.4 mol, and preferably from 1.05 to 1.3 mol, of hydrogen chloride is usually used for each chemical equivalent of nitric oxide reactant. Sufficient excess of hydrogen chloride should be used over that consumed in the formation of the nitrosyl chloride to condense with the water in the reaction mixture and form a concentrated aqueous hydrochloric acid solution, i. e., a solution containing at least 20 per cent by weight of hydrochloric acid. The resultant hydrochloric acid solution may be separated from the reacted mixture, thus preventing in large part reaction between the nitrosyl chloride product and the water to form undesirable by-products. When the reaction is carried out at temperatures above the condensing temperature of the aqueous hydrochloric acid, the reacted mixture is preferably cooled to condense the hydrochloric acid solution and the latter then removed from the mixture.

The reacted gaseous mixture from which the concentrated aqueous hydrochloric acid has been separated contains the nitrosyl chloride in vaporized form, together with any diluent gases, e. g., carbon monoxide, carbon dioxide, etc., introduced with the reactants. When air has been used as the oxidizing agent in preparing the nitrosyl chloride, the latter is, of course, also diluted with the nitrogen of the air. The gaseous mixture containing the nitrosyl chloride may be used directly in a chlorination reaction, although the nitrosyl chloride is preferably condensed, e. g., by cooling or by compressing, and separated from the uncondensed gaseous diluents, e. g., nitrogen, carbon monoxide, carbon dioxide, and low boiling hydrocarbons, which are withdrawn from the system. Halohydrocarbons, if present, are usually condensed along with the nitrosyl chloride. The separated nitrosyl chloride, may, if desired, be further purified in any convenient manner and then vaporized prior to its introduction to the chlorination step of the process. Alternatively, the nitrosyl chloride and halohydrocarbons may be separated from the gaseous mixture by scrubbing with a solvent, e. g., with carbon tetrachloride or chloroform, and the nitrosyl chloride then vaporized from the solution in highly purified form by heating.

The chlorination step of the process, in which the hydrocarbon compound is chlorinated with the nitrosyl chloride, is carried out in vapor phase and at a temperature above about 190° C. and below the temperature at which appreciable thermal decomposition of either the hydrocarbon reactant or product occurs. Although the optimum reaction temperature depends somewhat upon the particular compound being chlorinated, the reaction is usually carried out at temperatures between 190° and 600° C., and preferably between 300° and 550° C. The optimum temperature for the chlorination of aromatic compounds is usually somewhat higher than for the chlorination of aliphatic compounds. The reaction, which in most instances is exothermic, proceeds rapidly and heating is necessary only until the desired temperature is reached, after which the reacting mixture is usually cooled. However, in the case of reactions which are only slightly exothermic, heating may be continued throughout the reaction period. The space velocity, i. e., the cubic feet of gaseous reaction mixture, referred to standard conditions of 0° C. and 760 m. m. pressure, per hour per cubic foot of reaction zone, may be varied over a wide range. It should be mentioned, however, that the higher the space velocity employed, the higher is the reaction temperature which must be maintained to secure satisfactory completion of the chlorination reaction. In some instances the use of high space velocities and high temperatures leads to excessive decomposition of the hydrocarbon compound due to cracking, etc. In such cases the space velocity and the reaction temperature are adjusted so as to reduce the amount of decomposition. Space velocities of 25 to 75 are usually preferred, although higher or lower space velocities may be used.

The proportions of the reactants, i. e., of the nitrosyl chloride and of the compound being chlorinated, depend upon the degree of chlorination desired and also to some extent upon the reaction conditions. Although the reactants are usually used in approximately the stoichiometrical proportions required to give the desired product, it is frequently advantageous to use proportions of the nitrosyl chloride higher or lower than those indicated by the chemical equation involved. Thus in the chlorination of a saturated hydrocarbon or halohydrocarbon containing a hydrogen atom replaceable with chlorine to introduce one chlorine atom into the molecule, it is frequently desirable to employ the hydrocarbon compound and nitrosyl chloride in approximately equimolecular quantities to avoid formation of excessive amounts of dichlorinated compounds. In some instances, wherein the exhaustive chlorination of a compound is desired, it is advantageous to use more than the stoichiometric proportion of nitrosyl chloride to insure substantial completion of the reaction. The chlorination may be carried out at atmospheric pressure or at higher or lower pressures.

The reacted mixture may be cooled and/or compressed or cooled and scrubbed with a solvent to condense a substantial portion of the chlorinated product and separate it from the uncondensed gases. The liquid chlorinated product or the extract thereof, which may contain minor amounts of unreacted nitrosyl chloride and of nitrogenous by-products, may be purified, if desired, in any one of a number of ways, such as by washing with water or dilute alkalies, or both, and distilling. One of the nitrogenous by-products which may be formed during the chlorination step, particularly in the exhaustive chlorination of hydrocarbons, e. g. the exhaustive chlorination of methane to form carbon tetrachloride, is ammonium chloride, which separates in solid form from the reacted gaseous mixture when the latter is cooled. The solid ammonium chloride thus formed may be recovered in relatively pure form in a number of ways, e. g., by collecting it as a slurry along with the chlorinated hydrocarbon compound, separating it from the latter by filtration, and subsequently warming it to remove any volatile ingredients.

The uncondensed gaseous mixture from which the liquid chlorinated product has been separated contains any unused and uncondensed gaseous reactants, the nitric oxide formed during the chlorination and in some instances hydrogen chloride. It may also contain appreciable quantities of carbon monoxide and carbon dioxide, which are usually formed in minor amounts during the exhaustive chlorination of hydrocarbons, as well as minor proportions of uncondensed halohydrocarbons formed during the reaction. As mentioned previously, the mixture is recycled and reacted with further quantities of hydrogen chloride and with the oxidizing agent to produce additional quantities of nitrosyl chloride.

As has been mentioned above, the preparation of the nitrosyl chloride and the subsequent chlorination with it may each be carried out over a wide range of pressures which may include pressures above or below atmospheric. It is not necessary that these operations be carried out at the same pressure, although it renders the process more convenient to do so. It is desirable, but not necessary, that the entire process be carried out at super-atmospheric pressure, e. g., at from 1 to 10 atmospheres, in order to facilitate condensation of the various fractions, e. g., of the aqueous hydrochloride acid, the nitrosyl chloride, and the chlorohydrocarbon product, without resorting to inconveniently low temperatures or to mechanical compression of the products under treatment. The latter operation is somewhat difficult due to the corrosive nature of some of the products, particularly of the nitrosyl chloride and the moist hydrogen chloride. By operating the entire process at a sufficiently high pressure which is constant throughout the system, it is only necessary to compress the ingredients entering the system and then to cool with water or cold brine at the desired points in the cycle to condense the desired liquid fractions.

The following examples describe certain ways in which the principle of the invention may be applied, but are not to be construed as limiting its scope.

Example 1

A gaseous mixture containing 93.6 pounds of nitric oxide and 75.8 pounds of hydrogen chloride recovered from the cyclic chlorination of normal butane with nitrosyl chloride is reacted at atmospheric pressure and in continuous manner and with cooling so as to maintain the reaction temperature at about 75° C. with a dry gaseous mixture of 43.5 pounds of hydrogen chloride and 111 pounds of air. The reacted mixture, which consists largely of nitrosyl chloride, water vapor and unreacted hydrogen chloride, is cooled sufficiently to condense out a major portion of the water as an aqueous hydrochloric acid solution. There is obtained 42 pounds of 34 per cent concentrated aqueous hydrochloric acid solution. The aqueous hydrochloric acid is separated and the remaining gases are refrigerated to condense the nitrosyl chloride, after which the residual gas consisting largely of nitrogen is discarded. The condensed nitrosyl chloride, which weights 200 pounds, is vaporized and passed at atmospheric pressure and in continuous manner, together with 100 pounds of normal butane containing 5.0 per cent butylenes, at a space velocity for the total vapors of 50, through a reaction zone maintained at about 300° C. The gases issuing from the reaction zone are cooled and scrubbed with kerosene. Upon distilling the kerosene extract there is obtained 44.2 pounds of unchlorinated butane, 5 pounds of mixed butylenes, 43.1 pounds of 2-chlorobutane, 18.5 pounds of 1-chlorobutane and 17.7 pounds of dichlorobutanes. The recovered butane and butylenes are mixed with 50.8 pounds of butane and recycled to the chlorination step described above. The gaseous mixture, which after scrubbing with kerosene contains 90.6 pounds of nitric oxide and 75.8 pounds of hydrogen chloride, is combined with 3 pounds of additional nitric oxide and is recycled to the first of the above steps.

Example 2

A gaseous mixture obtained during the cyclic chlorination of methane to form carbon tetrachloride and which contains 1025 pounds of nitric oxide, 600 pounds of hydrogen chloride, 38.5 pounds of carbon monoxide and 41 pounds of carbon dioxide, together with small amounts of methane and chloromethanes, is reacted in continuous manner at atmospheric pressure and at about 75° C. with a dry gaseous mixture of 780 pounds of hydrogen chloride and 1320 pounds of air. The reacted mixture is cooled sufficiently to condense out a major portion of the water formed in the reaction with the unreacted excess of hydrogen chloride in the form of an aqueous solution of the latter. There is obtained 437 pounds of 30 per cent concentrated aqueous hydrochloric acid solution. The aqueous hydrochloric acid is separated and the uncondensed gases are refrigerated sufficiently to condense the nitrosyl chloride, and the residual gases, consisting principally of nitrogen, carbon monoxide, and carbon dioxide, are vented. The condensed nitrosyl chloride, which weighs 2240 pounds, is vaporized and passed at atmospheric pressure and in continuous manner, together with 100 pounds of gaseous methane containing small amounts of recycled chloromethanes, at a space velocity for the total vapors of 50 through a reaction zone maintained at about 290° C. The reacted gases are cooled to about −50° C. to condense the carbon tetrachloride and the ammonium chloride products together with minor amounts of methane, lower chloromethanes and unreacted nitrosyl chloride. The condensate is a slurry of solid ammonium chloride and the other products which are in liquid form. The slurry is separated from the remaining gases and filtered to separate the ammonium chloride, which is subsequently warmed to free it from volatile products. The dry ammonium chloride weighs 100 pounds. The filtrate from the ammonium chloride is distilled. The nitrosyl chloride, methyl chloride, methylene chloride and chloroform distill first and are recycled to the chlorination step. Upon further distillation there is obtained 610 pounds of pure carbon tetrachloride. The gaseous mixture from which the slurry of carbon tetrachloride and ammonium chloride has been separated consists of 975 pounds of nitric oxide, 600 pounds of hydrogen chloride, 38.5 pounds of carbon monoxide, 41 pounds of carbon dioxide, and small amounts of methane and chloromethanes. This mixture is combined with 60 pounds of additional nitric oxide and is then recycled to the first of the above described steps.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. A method for preparing nitrosyl chloride substantially free of water and elemental chlorine which comprises reacting a gaseous mixture containing approximately stoichiometric proportions of nitric oxide and an oxidizing agent selected from the class consisting of oxygen, nitric acid, and nitrogen oxides containing nitrogen with a valence greater than 3, togther with at least 1.03 moles of hydrogen chloride for each chemical equivalent of nitric oxide reactant, to form nitrosyl chloride and water, and separating concentrated aqueous hydrochloric acid from the reacted mixture.

2. A method for preparing nitrosyl chloride substantially free of water and elemental chlorine which comprises reacting a gaseous mixture containing approximately stoichiometric proportions of nitric oxide and an oxidizing agent selected from the class consisting of oxygen, nitric acid and nitrogen oxides containing nitrogen with a valence greater than three, together with from 1.03 to 1.4 mol of hydrogen chloride for each chemical equivalent of nitric oxide reactant, at a temperature between 0° and 400° C. to form nitrosyl chloride and water, separating concentrated aqueous hydrochloric acid from the reacted mixture and subsequently condensing nitrosyl chloride from the remaining mixture and separating it in liquid form.

3. A method for preparing nitrosyl chloride substantially free of water and elemental chlorine which comprises reacting a gaseous mixture containing approximately stoichiometric proportions of nitric oxide and an oxidizing agent selected from the class consisting of oxygen, nitric acid and nitrogen oxides containing nitrogen with a valence greater than three, together with from 1.05 to 1.3 mol of hydrogen chloride for each chemical equivalent of nitric oxide reactant, at a temperature between 0° and 400° C. to form nitrosyl chloride and water, separating concentrated aqueous hydrochloric acid from the reacted mixture and subsequently condensing nitrosyl chloride from the remaining mixture and separating it in liquid form.

4. A method for preparing nitrosyl chloride substantially free of water and elemental chlorine which comprises reacting a gaseous mixture containing approximately stoichiometric proportions of nitric oxide and oxygen, together with from 1.03 to 1.4 mol of hydrogen chloride for each chemical equivalent of nitric oxide reactant, at a temperature between 0° and 400° C. to form nitrosyl chloride and water, separating concentrated aqueous hydrochloric acid from the reacted mixture and subsequently condensing nitrosyl chloride from the remaining mixture and separating it in liquid form.

5. A method which comprises reacting together hydrogen chloride, nitric oxide and an oxidizing agent selected from the class consisting of oxygen, nitric acid and nitrogen oxides containing nitrogen with a valence greater then three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner with a compound selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps.

6. A method which comprises reacting together hydrogen chloride, nitric oxide and an oxidizing agent selected from the class consisting of oxygen, nitric acid and nitrogen oxides containing nitrogen with a valence greater than three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with a compound selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound, and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps.

7. A method which comprises reacting together hydrogen chloride, nitric oxide and an oxidizing agent selected from the class consisting of oxygen, nitric acid and nitrogen oxides containing nitrogen with a valence greater than three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 300° and 550° C. and at a space velocity between 25 and 75 cubic feet of reaction mixture, reduced to standard conditions of 0° C. and 760 m. m. pressure, per hour per cubic foot of reaction zone with a compound selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps.

8. A method which comprises reacting together hydrogen chloride, nitric oxide and an oxidizing agent selected from the class consisting of oxygen, nitric acid and nitrogen oxides containing nitrogen with a valence greater than three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with an aliphatic compound containing from one to five carbon atoms inclusive in the molecule and selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps.

9. A method which comprises reacting together hydrogen chloride, nitric oxide and an oxidizing agent selected from the class consisting of oxygen, nitric acid and nitrogen oxides containing nitrogen with a valence greater than three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with methane to form a chlorinated methane and nitric oxide, condensing and separating from the reacted mixture a fraction thereof comprising the chlorinated methane, and returning an uncondensed portion of the reaction mixture comprising nitric oxide and hydrogen chloride to the first of the foregoing steps.

10. A method which comprises reacting together hydrogen chloride, nitric oxide and an oxidizing agent selected from the class consisting of oxygen, nitric acid and nitrogen oxides containing nitrogen with a valence greater than three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with butane to form a chlorinated butane and nitric oxide, condensing and separating from the reacted mixture a fraction thereof comprising the chlorinated butane, and returning an uncondensed portion of the reaction mixture comprising nitric oxide and hydrogen chloride to the first of the foregoing steps.

11. A method which comprises reacting together hydrogen chloride, nitric oxide and an oxidizing agent selected from the class consisting of oxygen, nitric acid and nitrogen oxides containing nitrogen with a valence greater than three, to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with propane to form a chlorinated propane and nitric oxide, condensing and separating from the reacted mixture a fraction thereof comprising the chlorinated propane, and returning an uncondensed portion of the reaction mixture comprising nitric oxide and hydrogen chloride to the first of the foregoing steps.

12. A method which comprises reacting together hydrogen chloride, nitric oxide and an oxidizing agent selected from the class consisting of oxygen, nitric acid and nitrogen oxides containing nitrogen with a valence greater than three, at a temperature between 0° and 400° C. to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with a compound selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps; all of the steps of said method being carried out at the same pressure within the range of from one to ten atmospheres inclusive.

13. A method which comprises reacting together hydrogen chloride, nitric oxide and an oxidizing agent selected from the class consisting of oxygen, nitric acid and nitrogen oxides containing nitrogen with a valence greater than three, at a temperature between 0° and 400° C. to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with an aliphatic compound containing from one to five carbon atoms inclusive in the molecule and selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps.

14. A method which comprises reacting approximately stoichiometric proportions of nitric oxide and oxygen, together with from 1.03 to 1.4 mol of hydrogen chloride for each chemical equivalent of nitric oxide reactant, at a temperature between 0° and 400° C. to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with an aliphatic compound containing from one to five carbon atoms inclusive in the molecule and selected from the class consisting of unsaturated hydrocarbons, unsaturated halohydrocarbons and saturated hydrocarbons and halohydrocarbons which contain a hydrogen atom replaceable with chlorine, to form a chlorinated hydrocarbon compound and nitric oxide, condensing and separating from the reacted mixture a fraction thereof comprising the chlorinated hydrocarbon compound, and returning an uncondensed portion of the reaction mixture comprising nitric oxide and hydrogen chloride to the first of the foregoing steps.

15. A method which comprises reacting approximately stoichiometric proportions of nitric oxide and oxygen, together with from 1.03 to 1.4 mol of hydrogen chloride for each chemical equivalent of nitric oxide reactant, at a temperature between 0° and 400° C. to form nitrosyl chloride and water, separating concentrated aqueous hydrochloric acid from the reacted mixture, subsequently condensing nitrosyl chloride from the remaining mixture and separating it in liquid form, vaporizing the nitrosyl chloride, reacting the vaporized nitrosyl chloride in continuous manner at a temperature between 190° and 600° C. and at a space velocity between 25 and 75 cubic feet of reaction mixture, reduced to standard conditions of 0° C. and 760 m. m. pressure, per hour per cubic foot of reaction zone with methane to form carbon tetrachloride and nitric oxide, condensing and separating from the reacted mixture a fraction thereof comprising carbon tetrachloride, and returning an uncondensed portion of the reaction mixture comprising nitric oxide and hydrogen chloride to the first of the foregoing steps.

JOHN J. GREBE.
WILLIAM C. BAUMAN.
HAROLD A. ROBINSON.